United States Patent
Krieger et al.

[11] Patent Number: 6,073,608
[45] Date of Patent: Jun. 13, 2000

[54] METHOD FOR INJECTING FUEL INTO THE COMBUSTION CHAMBERS OF AN AIR-COMPRESSING, SELF-IGNITING INTERNAL COMBUSTION ENGINE

[75] Inventors: Klaus Krieger, Affalterbach; Hermann Grieshaber, Aichtal; Heribert Haerle, Stuttgart, all of Germany

[73] Assignee: Robert Bosch GmbH, Stuttgart, Germany

[21] Appl. No.: 09/174,546

[22] Filed: Oct. 19, 1998

[30] Foreign Application Priority Data

Oct. 25, 1997 [DE] Germany .................... 197 47 231

[51] Int. Cl.⁷ ............................................. F02B 3/00
[52] U.S. Cl. ................................ 123/299; 123/300
[58] Field of Search ................................. 123/299, 300

[56] References Cited

U.S. PATENT DOCUMENTS

| | | | |
|---|---|---|---|
| 5,666,916 | 9/1997 | Fujieda et al. | 123/295 |
| 5,713,326 | 2/1998 | Huber | 123/299 |
| 5,890,459 | 4/1999 | Herrick et al. | 123/299 |

FOREIGN PATENT DOCUMENTS 0 621 400 A1   4/1994   European Pat. Off. .

*Primary Examiner*—John Kwon
*Attorney, Agent, or Firm*—Ronald E. Greigg; Edwin E. Greigg

[57] ABSTRACT

A method and apparatus for injecting fuel into combustion chambers of an internal combustion engine, in which the total injection quantity for the engine is split into a main injection quantity and a small postinjection quantity, the latter being closely coupled to the end of the main injection quantity and being injected with the same fuel pressure as the main injection quantity. This reduces soot emissions at otherwise identical engine operating parameters. Because of the interaction among soot emissions, $NO_x$ emissions and specific consumption, the postinjection, while soot and $NO_x$ emissions are kept the same, can also be employed to lower the specific consumption of the engine.

20 Claims, 5 Drawing Sheets

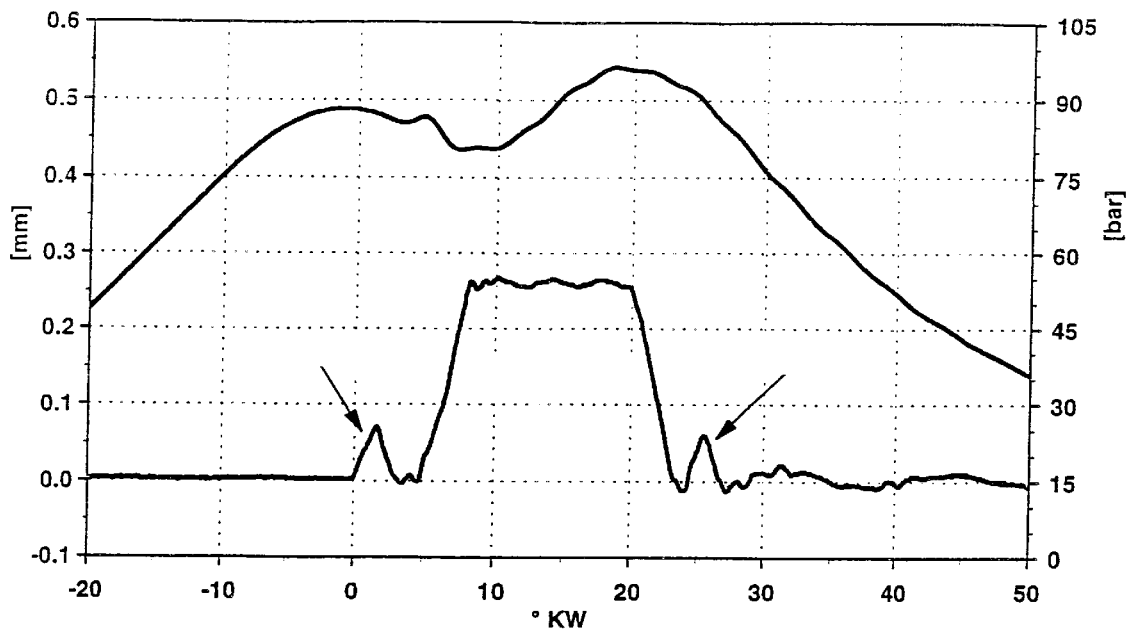
Fig.6
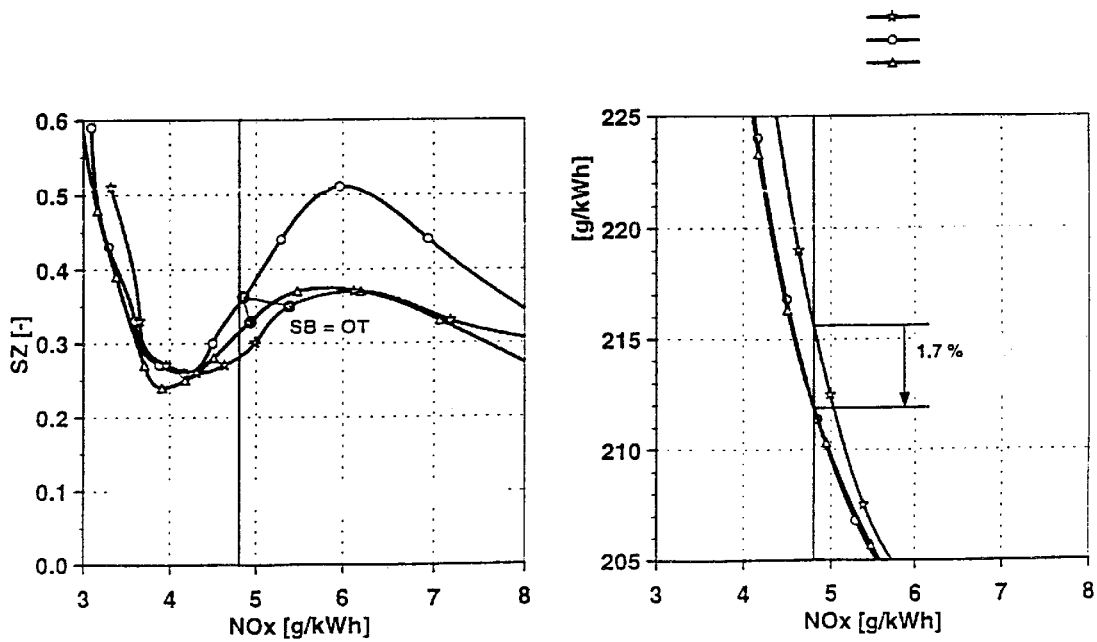
Fig.7a
Fig.7b

METHOD FOR INJECTING FUEL INTO THE COMBUSTION CHAMBERS OF AN AIR-COMPRESSING, SELF-IGNITING INTERNAL COMBUSTION ENGINE

BACKGROUND OF THE INVENTION

The invention is based on a method for injecting fuel into the combustion chambers of an air-compressing, self-igniting internal combustion engine. In one such method, known from European Patent Disclosure EP-A1 0 621 400, a postinjection of fuel after the main injection, in conjunction with an exhaust gas post treatment device, is proposed with the goal of reducing the $NO_x$ components in the exhaust gas. A so-called $deNO_x$ catalytic converter is provided as the post-treatment device, which in combination with highly reactive hydrocarbon fragments in the exhaust gas is intended to bring about a reduction of the $NO_x$ components. This reduction is efficient in particular only whenever still uncombusted hydrocarbons enter the catalytic converter. To that end, in particular, a late postinjection is employed, which occurs at a crankshaft angle of 80° after top dead center; although the fuel is not combusted, nevertheless because of the residual heat it is optimally prepared by being evaporated or cracked. The hydrocarbon molecules thus produced can then subsequently bring about an optimal $NO_x$ conversion in the catalytic converter. However, this fuel injection is not active or effective until the operating temperature of the catalytic converter or the exhaust gas temperature is sufficiently high. For an operating range in which this optimal exhaust gas temperature has not yet been reached, it is also proposed that an early postinjection be performed, which is intended to be in the range between 20° and 80° of crankshaft angle after top dead center. This injection takes place whenever the combustion of the fuel quantity introduced via the main injection has at least largely ended. The fuel quantity injected thereafter via the postinjection is intended then to combust as completely as possible, for the sake of heating up to the exhaust gas temperature and bringing the catalytic converter to the desired temperature. Once that has been done, the postinjection proceeds as noted above.

Along with the goal of reducing $NO_x$ emissions, however, in Diesel engines there is also the need with regard to exhaust gas emissions to keep the soot components in the exhaust gas low. The known method provides no points of departure for achieving this. Beyond the goal of reducing soot emissions, there is also the goal, in the sense of optimizing a Diesel injection system, of keeping the specific fuel consumption and noise low.

OBJECT AND SUMMARY OF THE INVENTION

By the method according to the invention, a considerable reduction in soot production in the exhaust at given operating parameters is attained. In addition, it becomes possible to lower the fuel consumption while adhering to certain $NO_x$ values in the exhaust gas. In conventional fuel injection systems, undesired postinjections often occur, which result from flaws in the injection system. Such flaws are for instance defects in the injection nozzle and in the dynamics of the pressure wave course between the fuel pump and the injection nozzle. Such unintended postinjections of fuel occur at low fuel injection pressure, which has just barely exceeded the nozzle opening pressure of the injection values. The fuel reaching the combustion chamber is then poorly prepared, and its introduction occurs at a completely arbitrary, improper time. Such unintended injections cause pronounced hydrocarbon and soot emissions. Furthermore, carbonization of the injection nozzles has an unfavorable effect on the injection characteristic of the injection nozzles. Along the lines of the prior art discussed at the outset, a method has been developed for performing the postinjection more purposefully in order to increase the effectiveness of an exhaust gas catalytic converter. The fuel quantity postinjected in this process does not take part in the actual combustion in the working stroke, nor is it subject to the more stringent demands made in terms of chronological precision of the injection, precise adherence to the quantity of the injection, and a specific injection pressure.

With the targeted postinjection of the invention, which is coupled to the end of the main injection, or in other words immediately ensues after the end of the injection event for the main injection, a subdivided injection is obtained which is extremely effective with regard to reducing soot emissions. It is quite essential that the fuel injection in the postinjection occur at the same injection pressure as the injection in the main injection. Above all, this distinguishes this injection from unintended postinjections at a lower injection pressure. In conjunction with an injection system that furnishes a high-pressure fuel reservoir which is constantly supplied by a high-pressure pump and whose fuel is drawn by electrically controlled fuel injection valves, the fuel injection according to the invention with a main injection and postinjection is possible. The high fuel pressure in the postinjection as well brings about optimal preparation of the introduced fuel, which continues to participate in the combustion. The main and postinjection together form the total injection quantity per working stroke of the engine. Advantageously, the postinjection occurs as soon as possible after the end of the main injection. Thus it is fixedly coupled to the end of the main injection, and only in this way is the favorable effectiveness of the postinjection obtained, which initiates a newly ensuing combustion event under the pressure and temperature conditions of the combustion chamber that are required for fuel combustion in the working stroke. As a result of this newly ensuing injection, the reaction of the already-introduced fuel quantity together with the postinjection is set into motion once again.

Accordingly, the quantity of the postinjection varies as a function of the engine operating parameter, and it is controlled by an electric control unit that assures that the postinjection occurs immediately following the main injection as desired and in the required quantity. These control values for the control unit are stored in a performance graph which has been ascertained in an optimizing process and is engine-specific. The postinjection does not occur until after a lower load point is exceeded, below which point no particular effectiveness of the postinjection can be demonstrated. Within the context of the performance graph definition, the quantity of the postinjection is also optimized with respect to the load. It can happen that the fuel quantity to be injected must increase or increase with increasing load, depending on the operating rpm, if optimal soot emissions reduction is to be achieved. In this connection, substantial soot emissions reductions will as a rule not be attainable until load ranges of 10 to 25% of full load, so that an engine with postinjection is operated primarily in the medium and upper load range. The definition of the control values for the control unit in the performance graph is done with the aid of sensors, and to control the onset of the postinjection, the opening and closing times of the injection valves at the various operating points are detected, in particular with the aid of sensors mounted on the injection valves. This is done while the soot emissions in the exhaust gas are being monitored and with the postinjection quantity being optimized. The optimization is also done by varying the injection pressure that is available by means of the fuel from the high-pressure fuel reservoir. This optimization has a particularly favorable effect in that it reduces $NO_x$ components and fuel consumption.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 6 is a graph similar to FIG. 5 but with additional preinjection; and

FIGS. 7a and 7b show the relationship between the blackening coefficient, $NO_x$ emissions and specific fuel consumption, plotted over various injection onset times, in comparison of engine operation without preinjection and postinjection, with preinjection but without postinjection, and with preinjection (VE) and postinjection (NE).

DESCRIPTION OF THE PREFERRED EMBODIMENT

Figure 1A:
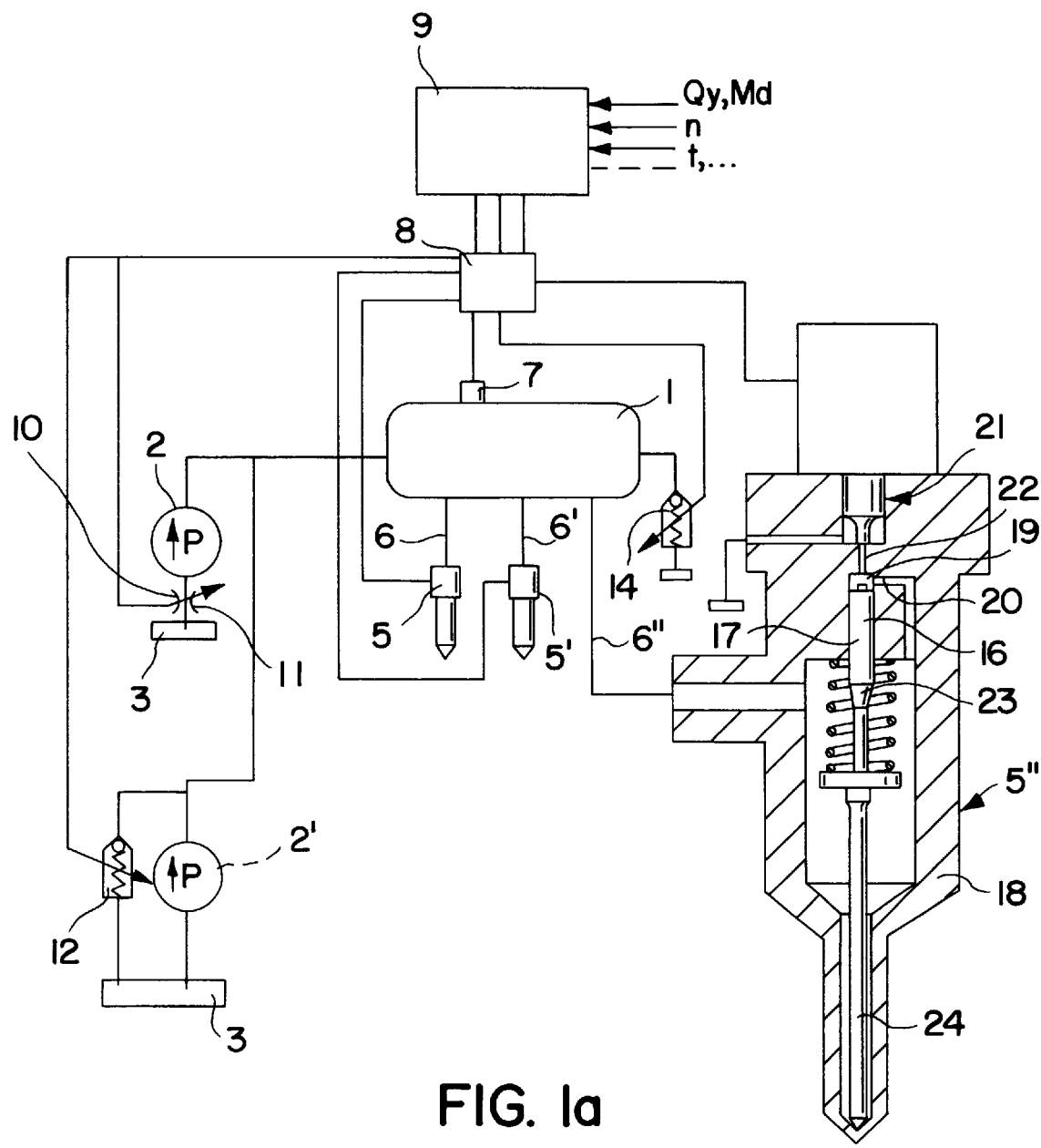
FIG. 1a schematically shows a fuel injection system illustrating a feed pump with a variable pressure control valve.
Figure 1B:
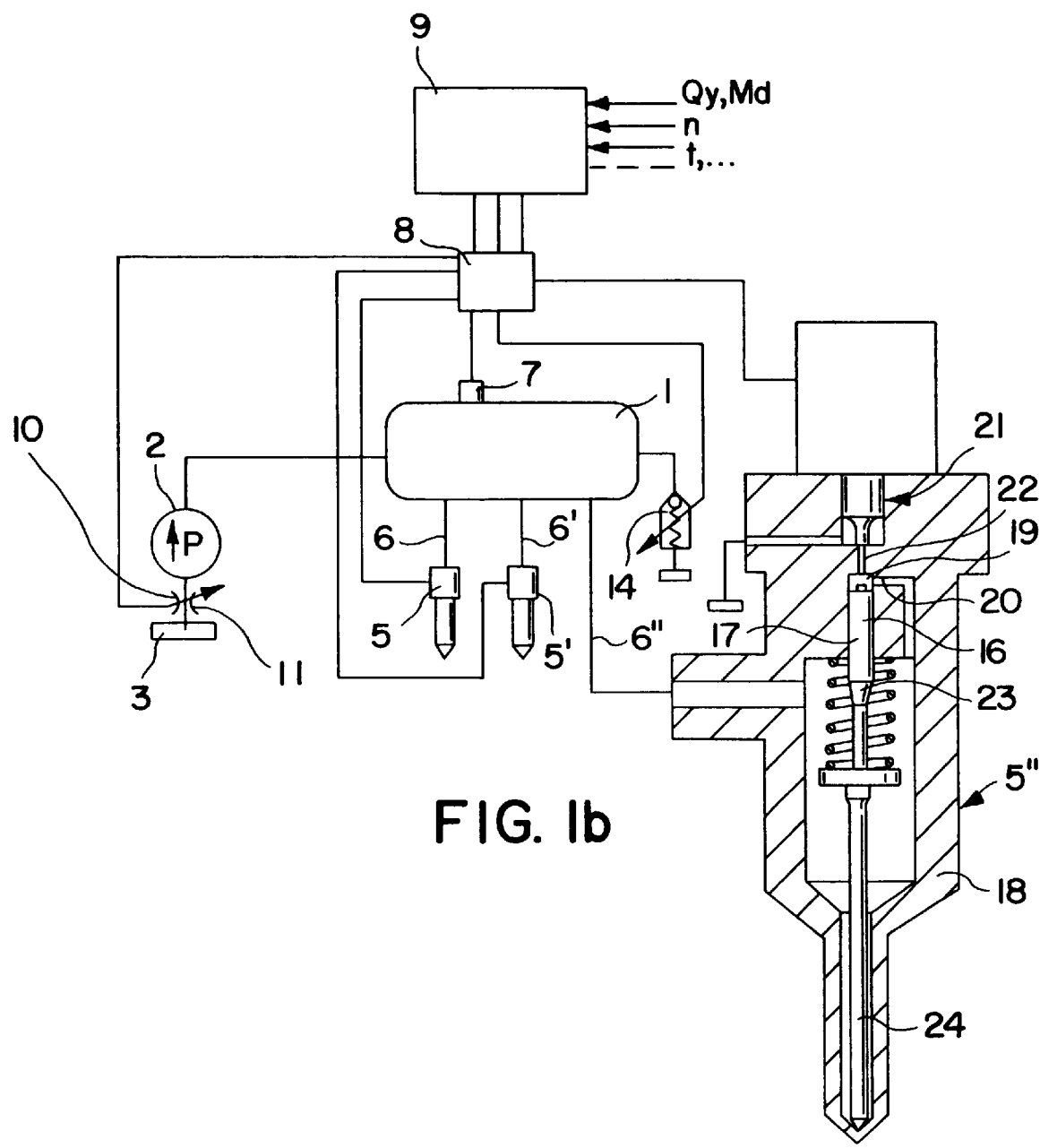
FIG. 1(b) illustrates a system including a high pressure pump with a variable intake throttle.

In FIG. 1a and FIG. 1b, a high-pressure fuel reservoir 1 (rail) is shown, which is supplied with fuel by a high-pressure fuel pump 2 from a fuel tank 3. A plurality of identically embodied fuel injection valves 5, 5', 5" are connected via pressure lines 6, 6', 6" to the high-pressure fuel reservoir and supply the fuel injection valves with high-pressure fuel. If at all possible, the high-pressure fuel reservoir is supplied by the high-pressure pump 2 with only the fuel quantity then also drawn by the fuel injection valves. To that end, the supply quantity of the high-pressure quantity pumped from the fuel tank 3 can be controlled as a function of the pressure (rail pressure) in the high-pressure fuel reservoir (rail). For detecting the pressure, a pressure sensor 7 is provided, whose output values are delivered to a control unit 8. The control unit evaluates the pressure sensor output signals and changes the signal into relation with a predetermined set-point value, which for example may be stored in a performance graph 9, and controls the high-pressure supply quantity of the high-pressure pump 2 in accordance with the deviation from the set-point value. To that end, for instance, influence can be exerted on a throttle device 10 in the lead line to the high-pressure pump, or intervention into the high-pressure pump itself can be made, such that with a pump piston feeding at a constant stroke, for instance, the duration of pumping is controlled with the aid of control members. Such control members may be oblique edge controls, which are electrically actuated, or magnet valves. Alternatively, the feed pump 2 can pump at a constant or rpm-dependent pumping quantity and in the process generate a pressure that exceeds what is needed. To set the desired fuel injection pressure in the high-pressure fuel reservoir, the pressure in the high-pressure fuel reservoir 1 will then be corrected, for instance electrically controlled by a pressure control valve 12 located in the bypass around the high-pressure pump 2'.

In addition to the control options named, limiting or additionally controlling pressure control valves 14 may be provided, which then in the event of pilot control of the pumping quantity on the side of the feed pump 2 (FIG. 1b) with the aid of a variable throttle 11, or of a feed pump 2' (FIG. 1a) with a pressure control valve 12, undertake a fine control of the high fuel pressure in the high-pressure fuel reservoir. This high pressure is essentially the effective injection pressure at the fuel injection valve. The fuel injection valves are all the same design; only the fuel injection valve 5" is shown in detail. Fuel injection valves of an electrically controlled type, like this, which are preferably used for injection from a common rail or high-pressure fuel reservoir 1, preferably have a piston 16, which is connected to an injection needle, not otherwise shown and which in a cylinder 17 of the fuel injection valve housing 18 defines a control chamber 19 on the face end. This control chamber communicates constantly with the high-pressure fuel reservoir via a throttle 20 and can also be relieved via an electrically controlled valve 21 and via a relief line 22. Such a valve, which can be called a control valve, can be actuated either electromagnetically or by a piezoelectric actuator. The latter option offers the advantage of very high control speed, which in conjunction with the small hydraulic volume of the control chamber 19 effects very rapid switching of the injection valve.

Instead of this version, in which the control valve 21 is a 2/2-way valve, other versions are also possible, for instance with a 3/2-way valve, with which the control chamber, instead of communicating constantly via the throttle 20, is connected selectively either to the high fuel pressure or to the relief chamber.

Finally, injection valves of an electrically controlled type are also known in which in the lead line between the high-pressure fuel reservoir and the injection location at the fuel injection valve, electrically controlled flow control members are provided. In the fuel injection valve shown in FIG. 1, the high fuel pressure is applied constantly to a pressure shoulder 23 of the nozzle needle 24, which opens whenever the control chamber 19 is relieved under the influence of the opening force applied to the pressure shoulder. Such valves are already known and need not be described in further detail.

The fuel injection valves can now be switched rapidly, even for the smallest fuel injection quantities, by means of the electric control unit 8 while the high fuel injection pressure is constantly applied. The control unit 8 has the function of maintaining a desired pressure in the high-pressure fuel reservoir, which pressure is substantially constant but in the final analysis can also be varied in purposeful fashion in accordance with certain operating modes of the associated engine, not shown here. In principle, the values of the fuel pressure to be established are stored in memory in the performance graph 9, where they can be optionally called up if certain operating parameters with variable values occur. The substantially constant setting value, is compared with the measurement value of the pressure sensor 7, and depending on the outcome of comparison an effective intervention is made via the fuel supply via the high-pressure fuel pump. At the same time, the performance graph serves to store the operating parameters of the invention that are definite for determining the fuel injection quantity and the fuel injection time. Essentially, the fuel injection time is kept at an optimized value, which is stored in the performance graph 9 and has been obtained from an optimizing process. To this extent, the fuel injection system now presented in FIG. 1 would be used in the usual way to supply injection fuel to an engine; supply in this way from a high-pressure fuel reservoir has the substantial advantage of injecting fuel, metered exactly, at a very high, always-available pressure. In particular, a high injection quality and very advantageous timing of the injection are thereby attained. The high injection pressure also promotes the preparation and favorable distribution of fuel in the engine combustion chambers, and thus promotes the goal of converting the fuel as completely as possible in the combustion chambers, with low pollutant emissions and low fuel consumption. This consumption is attained initially, in known fashion, by optimizing the injection time.

Figure 2A:
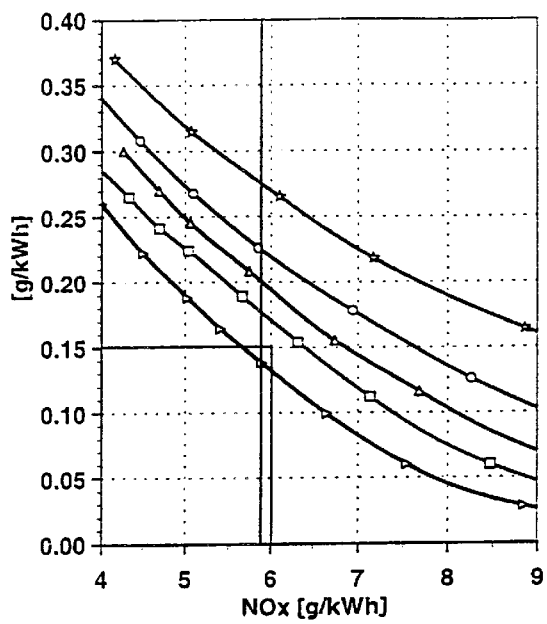
FIGS. 2a and 2b show the relationship between $NO_x$ and soot emissions and the specific fuel consumption at various injection pressures of the high-pressure fuel reservoir (rail)
Figure 2B:
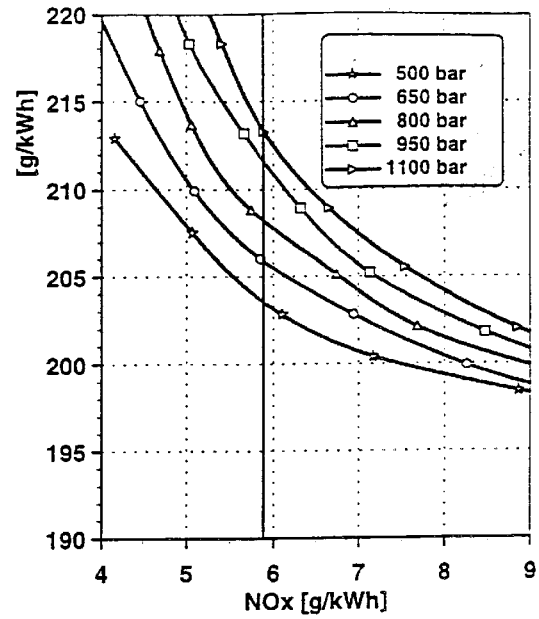

From the graphs, the relationships between pollutant emissions and fuel consumption for various injection pressures can be learned. FIG. 2a shows a family of curves with constant-curve injection pressures. The curve course is varied by means of the injection onset and represents the relationship between the proportion of soot and $NO_x$ in the exhaust gas. It can be seen that the lower the proportion of $NO_x$ in the exhaust gas, the higher the proportion of soot. Conversely, the proportion of soot decreases as the proportion of $NO_x$ rises, when the injection onset is varying. Curve 2a also shows that with increasing fuel injection pressure, lower soot and $NO_x$ values are attained. However, if one looks at the specific fuel consumption, it can be seen from FIG. 2b that first the specific fuel consumption becomes lower as well if the $NO_x$ emissions increase, and vice versa. However, in that case it is also true that with increasing fuel injection pressure, the specific fuel consumption rises together with the $NO_x$ content. For optimization, a middle value of the fuel pressure and the injection time must be found which all parameters have their lowest values, or for predetermined parameters such as $NO_x$ emissions or soot, where the other parameters assume their lowest values. Thus there have been limits in this situation to optimizing combustion.

Figure 5:
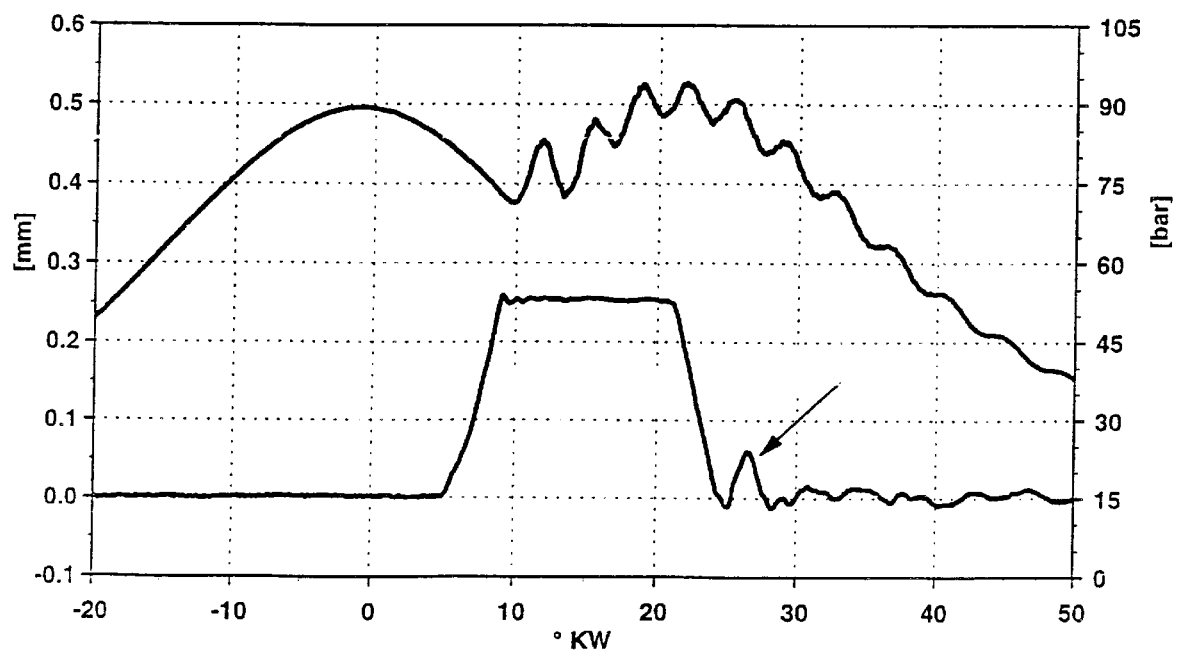
FIG. 5 shows the injection course in terms of the stroke of the needle of a fuel injection valve in a main injection and an ensuing postinjection in terms of the pressure established in the combustion chamber.

According to the invention, however, the main injection is now followed by a postinjection, as can be seen from the graph in FIG. 5. There, the needle stroke of the applicable fuel injection valve is plotted over the crankshaft angle, and from the lower line one can see the course of a main injection that begins at approximately 5° crankshaft angle and ends at 25° crankshaft angle, namely once the needle stroke has regained the value of 0.0. Immediately following this main injection, the valve is opened once again with a small needle stroke, which is designated by the arrow marked postinjection and then ends again at a crankshaft angle of approximately 28°. Over these injection events, the pressure in the combustion chamber is plotted; at first, because of the compression of the combustion chamber volume, it rises up to top dead center at a crankshaft angle of 0°, then in accordance with the piston motion drops again somewhat, and then rises again in the course of the main injection and the combustion, resulting from the injection, and expansion of the gas volume. This rise extends over the entire main injection and also encompasses the range of the postinjection, where then with an increasing crankshaft angle it gradually drops down to the initial value again.

From this relationship, it can be seen that the main injection and the postinjection participate directly in the combustion in the working stroke. It can also be seen that the postinjection is closely coupled to the end of the main injection and does not occur until once the fuel injection valve has closed entirely, at the end of the main injection. The interval between the main injection and the postinjection is kept as short as possible, and the postinjection is coupled directly to the end of the main injection, so that with increasing main injection, upon a shift in the main injection end toward larger crankshaft angles, the postinjection is also shifted in the direction of larger crankshaft angles. The associated engine then operates in the usual way, without any particular secondary exhaust gas post-treatment devices. The main injection and the postinjection are effected from one and the same fuel tank at the same high fuel injection pressure, and this postinjection, even at a short needle stroke, can be considered a full-value, exactly controlled injection, which can be distinguished quite clearly from unintentional postinjections at a lower fuel injection pressure. As noted at the outset, such postinjections are also under the influence of reflective pressure waves in pressure lines between the high-pressure source and the injection valve opening, whenever the opening pressure of the fuel injection valve is exceeded even slightly. The pressure then applied is in no way equivalent to the actual fuel injection pressure that is required for the main injection or the requisite fuel preparation. Electrically controlled values, and particularly also valves that operate with a piezoelectric actuator, are in a position to furnish the shortest possible opening times for the postinjection in an exactly controllable way.

Figure 3A:
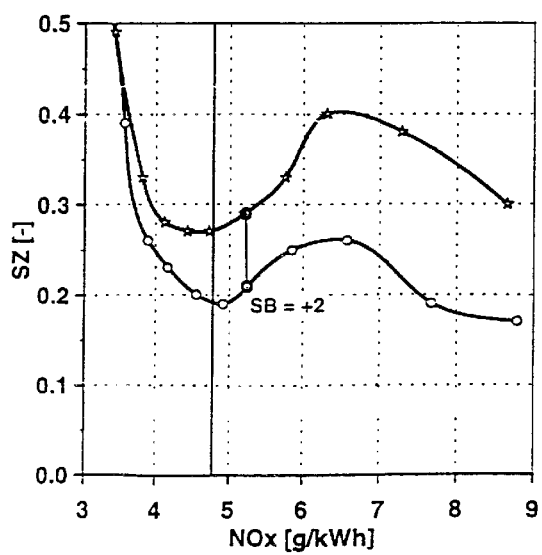
FIGS. 3a and 3b show the effect of the postinjection according to the invention on the following parameters: blackening coefficient SZ (soot component), $NO_x$, and specific fuel consumption, in comparison with operation of the engine without postinjection, plotted for various injection onset times.
Figure 3B:
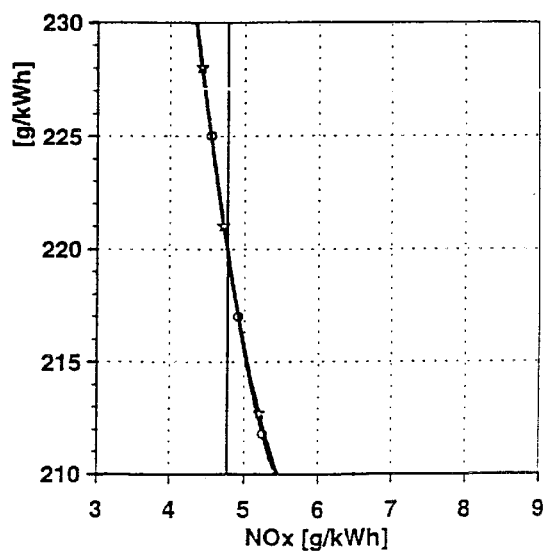

FIGS. 3a and 3b show curve courses for a varying injection onset in proportion to the blackening coefficient and the $NO_x$ emissions and specific fuel consumption in proportion of the $NO_x$ emissions, specifically for engine operation with and without postinjection. In FIG. 3a, it can be seen that with an increasing injection onset in the direction of "early" and an increasing $NO_x$ content, the curves diverge. For an injection onset of +2° crankshaft angle, for instance, a considerable reduction in the soot content in the exhaust gas is obtained if the combustion is effected with postinjection. Conversely, if in FIG. 3b one compares the effect of this provision on the specific fuel consumption, one can see that there is no worsening whatever; instead, the curves with postinjection and without postinjection are virtually congruent. The values shown in FIGS. 3a and 3b were ascertained for an engine rpm of 1400 and at 75% load. The injection pressure was 900 bar, for a postinjection quantity of about 12 mg per stroke. The curves in FIGS. 2a and 2b were likewise ascertained at 1400 rpm, but at 50% load.

On the basis of optimized postinjection, a reduction in the blackening coefficient of up to 30% is possible.

The small postinjection quantity introduced directly after the end of the main injection, which quantity is part of the total injection quantity, brings about a completely new impetus to the combustion in the combustion chamber, with the effect that particularly the soot-forming components in the combustion gases are better converted, without any negative effect on the other components in pollutant emissions. The postinjection quantity is likewise operationally effective as part of the total injection quantity. It is the goal also to convert this postinjection quantity completely, in contrast to other postinjection processes that serve solely to furnish a catalytic converter with the hydrocarbon emissions required for its operation and keeping them at operating temperature.

Figures 4A, 4B:
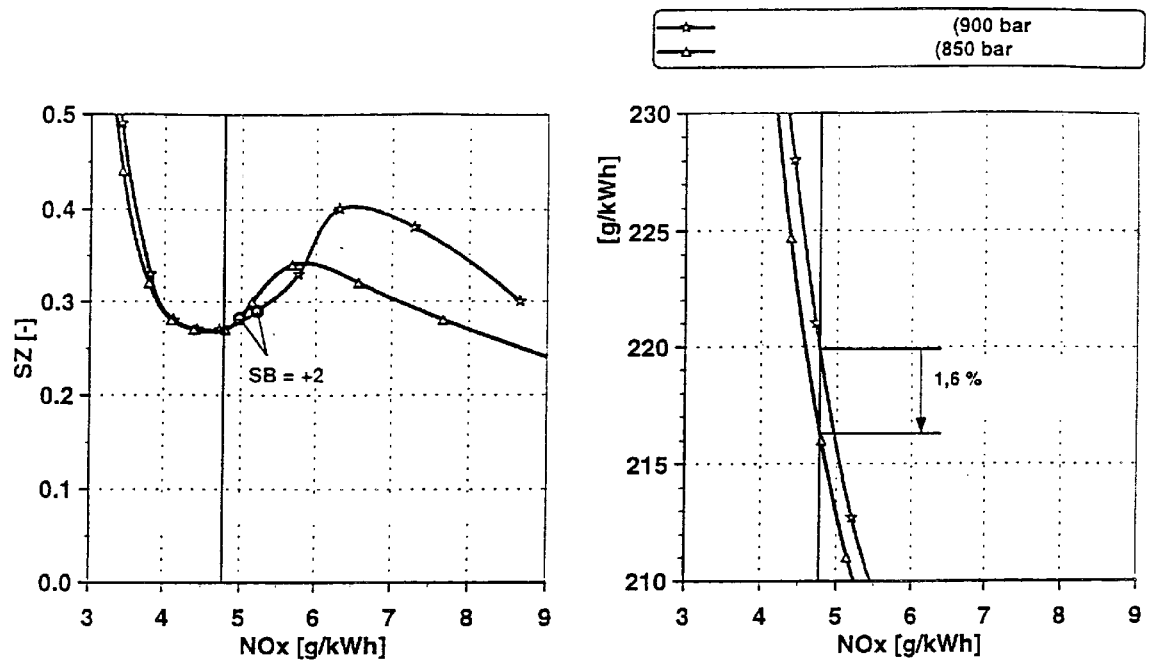
FIGS. 4a and 4b show the relationship between the blackening coefficient SZ, the $NO_x$ content, and the specific fuel consumption, plotted over various injection onset times in comparison between operation without postinjection and operation with postinjection, at various fuel injection pressures.

The relationships achieved here can advantageously be employed at the same time to lower the specific fuel consumption, as long as satisfactory emissions values can be adhered to in terms of the blackening coefficients or soot and $NO_x$ emissions. FIG. 4a shows this relationship, making use of the fact that in FIG. 2b the specific consumption also drops as the fuel injection pressure drops. This is naturally not unlimitedly true, but is primarily true within the context of the basic injection pressure. Compared with FIG. 2a, an increase in soot with decreasing fuel injection pressure can then be accepted, if a gain in terms of the soot coefficient has been attained by means of the postinjection. In FIG. 4a, two curves are plotted, one with postinjection at an injection pressure of 850 bar and one without postinjection at an injection pressure (rail pressure) of 900 bar. This pressure varies over the injection onset. It can be seen that by this choice of injection pressure, the two curves have virtually congruent courses for late injection onsets; that is, with postinjection and a reduction in the injection pressure, the blackening coefficients are not made worse with regard to the $NO_x$ emissions. Conversely, if one looks at the effect on the specific fuel consumption, one can see from FIG. 4b that the curves with postinjection and without postinjection have shifted relative to one another, in such a way that in operation with postinjection and a lower injection pressure, there is an advantage in terms of fuel consumption.

In this way, the exhaust gas emissions and fuel consumption values of an engine can be improved in an extremely economical way, without additional provisions for exhaust gas post-treatment. This technical capability exists in particular also by using high-pressure injection from a high-pressure fuel reservoir with rapidly controlled fuel injection valves. In addition, such an injection can also be combined with the known preinjection, which is known to lead to a decrease in noise and in fuel consumption.

This can be ascribed in particular to the shifting of the injection onset to early via the preinjection. This relationship can be seen in FIG. 6. In the lower curve beginning at a needle stroke 0.0 and a crankshaft angle of 0°, the onset of the preinjection is plotted; the main injection then follows and is in turn followed by the postinjection. The associated pressure course in the combustion chamber is represented in the curve above that, which shows that this course is substantially more uniform than in FIG. 5. In particular, here again the postinjection is located entirely in the operating pressure range of the cylinder of the engine.

FIGS. 7a and 7b show the effects on the parameters of the blackening coefficient and $NO_x$ and specific consumption, in a way analogous to FIGS. 4a and 4b. Here a total of three curves with a varying injection onset are plotted: a first curve, which as in the legend above FIG. 7b, top, is the result of operation without preinjection (VE) and without postinjection (NE); a second curve resulting from operation with preinjection and without postinjection; and a third curve, finally, resulting from operation with preinjection and with postinjection. It can be seen that given a suitable choice of the other parameters, such as the fuel injection pressure, which here again is held at 900 bar, with a 5 mg preinjection quantity per stroke and 12 mg postinjection quantity per stroke, the curves extend substantially congruently in the lower $NO_x$ ranges. As the injection onset is shifted increasingly toward early, the results become considerably worse for the blackening coefficient, in an operating mode with preinjection and without postinjection. This yields the known effect of preinjection, which does reduce noise and fuel consumption but increases the proportion of soot in the exhaust gas.

The consumption-reducing effect can be seen directly from FIG. 7b, where the curve with preinjection and the curve without postinjection are located to the left of the curve without preinjection and without postinjection. However, the curve with preinjection and with postinjection is then identical with this curve with preinjection and without postinjection, but with an increased advantage for specific consumption compared with FIG. 4. Compared with FIG. 7a, however, a substantial reduction in pollutant emissions is obtained here with regard to the blackening coefficients or the soot. If a substantial improvement in soot emissions is done without, then with this combined provision an even greater improvement in fuel consumption can be obtained. All in all, it is evident that the postinjection together with the usual provisions for improving emissions, noise and consumption in internal combustion engines has quite a substantial effect, which is highly surprising.

The postinjection, which as noted is coupled immediately with the main injection, is moreover variable in terms of quantity as well. It is essential that the postinjection quantity adhere to certain ranges, which in particular can also be ascertained empirically. It has been found that for postinjection quantities of less than 5 mg per stroke, no perceptible improvements in the blackening coefficients can be attained. On the other hand, if the postinjection quantity is increased above 20 mg per stroke, the hydrocarbon emissions are increased considerably. It is equally harmful if the immediate coupling of the postinjection to the main injection is not adhered to.

With increasing distance between the injection onset of the postinjection and the main injection, high hydrocarbon emissions are resumed, which until now has also been used to cause downstream exhaust gas treatment devices to become operative in the sense of reducing $NO_x$ components. Because of the immediately coupling of the postinjection to the main injection, it is necessary that the control values for both injections be stored in memory in a performance graph, if a considerable additional expenditure for measurement of injection needle strokes is not to be borne. Naturally such a measurement could also be performed in ongoing normal operation of the engine, but that would entail a very major effort and expense.

In an optimizing process, the injection events required over the operating field of the engine are therefore detected with the aid of needle stroke measuring sensors, and corresponding control values required for controlling the postinjection are input. At the same time, the control of the injection pressure can be optimized, in particular in order to attain the desired emissions and consumption values. It has been demonstrated that the postinjection is effective for use only beyond a certain load of the engine. The limit can be measured by detecting the emission values and can be input into the performance graph to control the postinjection. The limit is located in a range between 10% and 25% of full load; that is, only beyond higher values does it make sense to perform a postinjection. With increasing load, the quantity of the postinjection is varied in an optimizing fashion with regard to the current operating point. It has been found in the optimizations that for a given rpm, for instance 1200 rpm, the postinjection quantities can decrease with increasing load, in order to attain maximum improvements in exhaust emissions or consumption. Conversely, the relationship between load and the postinjection quantity at a higher rpm, such as 2000 rpm, is such that the postinjection quantity must increase with increasing load, in order to attain desired optimal exhaust gas emission values or consumption values. In other engines, possibly other tendencies may occur.

It is an essential fact that the postinjection has a very considerable influence on combustion and very considerably improves the outcome of combustion. For an already existing expenditure for a fuel injection system with a common rail and with electrically controlled injection valves, only relatively slight additional expense is needed to control the postinjection.

The foregoing relates to a preferred exemplary embodiment of the invention, it being understood that other variants and embodiments thereof are possible within the spirit and scope of the invention, the latter being defined by the appended claims.

We claim:

1. A fuel injection system for air-compressing, self-igniting internal combustion engines, comprising a high-pressure fuel reservoir (1) constantly supplied by a high-pressure pump (2, 2'), electrically controlled fuel injection valves (5, 5', 5") connected to the high-pressure fuel reservoir, said control valves are controlled by an electric control unit, the pressure of the high-pressure fuel reservoir is monitored by a pressure sensor (7), control signals from said pressure sensor (7) are received by the control unit (8), and depending upon the result of comparison with set-point values that are stored in a performance graph (9), an intervention into control elements (11, 12, 14) used for setting the pressure of the high-pressure fuel reservoir (1) is made by the control unit; that furthermore as a function of crankshaft angles specified in the performance graph, the injection onset and the end of the main injection and additionally the injection onset and end of a postinjection is controlled by the control unit, and as a function of operating parameters as well as a desired torque output by the engine, the main injection quantity and, corresponding to this quantity and to parameters defined in the performance graph, the onset and quantity of the postinjection are controlled.

2. A method for injecting fuel into combustion chambers of an air-compressing, self-igniting internal combustion engine, which comprises injecting a quantity of fuel by means of a main injection into a combustion chamber, after said main injection, injecting fuel via a post injection into the same combustion chamber of the engine, providing a high pressure pump feeding permanently fuel under high pressure into a high pressure fuel reservoir which is connected with at least one electrically controlled injection valve by which said main injection as well as the post injection is injected, providing means to insure that the injection pressure of the main injection and the post injection are the same, electrically controlling the opening and closing events of said injection valve for metering said main and post injection quantities of fuel, and effecting the opening event of the injection valve for the post injection after the closing event of said injection valve for termination of the main injection.

3. The method according to claim 2, further including providing means for calculating the total injection quantity to be injected per working stroke into a cylinder of said combustion engine as the sum of the quantity of said main injection and the quantity of said postinjection together, both said quantities to be burned in said working space.

4. The method according to claim 3, further including providing that the onset of the post injection immediately joins the end of the main injection.

5. The method according to claim 4, in which the quantity of the postinjection is controlled as a function of engine operating parameters and varies with an operating point of the engine.

6. The method according to claim 5, in which the onset of the postinjection is controlled as a function of a location of the end of the main injection, and the postinjection quantity is controlled by means of an electric control unit, which takes the requisite control values for the postinjection for the various engine operating points, in accordance with varying operating parameters, from a performance graph formed in an optimizing operation.

7. The method according to claim 3, in which the onset of the postinjection is controlled as a function of a location of the end of the main injection, and the postinjection quantity is controlled by means of an electric control unit, which takes the requisite control values for the postinjection for the various engine operating points, in accordance with varying operating parameters, from a performance graph formed in an optimizing operation.

8. The method according to claim 4, in which the onset of the postinjection is controlled as a function of a location of the end of the main injection, and the postinjection quantity is controlled by means of an electric control unit, which takes the requisite control values for the postinjection for the various engine operating points, in accordance with varying operating parameters, from a performance graph formed in an optimizing operation.

9. The method according to claim 1, in which the onset of the postinjection is controlled as a function of a location of the end of the main injection, and the postinjection quantity is controlled by means of an electric control unit, which takes the requisite control values for the postinjection for the various engine operating points, in accordance with varying operating parameters, from a performance graph formed in an optimizing operation.

10. The method according to claim 9, in which the performance graph of the postinjection quantity and the injection instants for the postinjection, which are fixed by the closure of the injection valves at an end of the respective main injection, in the engine operating field is detected with the aid of sensors that detect the opening and closing signals of the injection valves, with regard to the soot emissions that then occur in the engine exhaust gas, and is defined in the performance graph in optimizing fashion for the particular engine at the various operating points and operating parameters.

11. The method according to claim 9, in which in the optimizing operation, to attain the lowest possible fuel consumption while adhering to the allowable $NO_x$ proportion and the allowable soot content, the injection pressure of the fuel in the high-pressure fuel reservoir is reduced.

12. The method according to claim 2, in which the operation of the engine with postinjection occurs only above a certain engine load.

13. The method according to claim 12, in which the engine load beyond which the engine is operated with postinjection is determined in that upon the optimization of the quantity of the postinjection, beyond that load of the engine, a reduction in the proportional soot in the exhaust gas ensues.

14. The method according to claim 13, in which the quantity of the postinjection is optimized in conjunction with an optimization of a specific consumption, soot emissions, and $NO_x$ emissions as a function of the injection onset of the main injection and of the injection pressure that is set in the high-pressure fuel reservoir.

15. The method according to claim 13, in which the postinjection, ensues beyond a lower load point of the engine that is between 10 and 25% and preferably is 25% of the full load as the engine load increases.

16. The method according to claim 13, in which the performance graph of the postinjection quantity and the injection instants for the postinjection, which are fixed by the closure of the injection valves at an end of the respective main injection, in the engine operating field is detected with the aid of sensors that detect the opening and closing signals of the injection valves, with regard to the soot emissions that then occur in the engine exhaust gas, and is defined in the performance graph in optimizing fashion for the particular engine at the various operating points and operating parameters.

17. The method according to claim 14, in which the postinjection, ensues beyond a lower load point of the engine that is between 10 and 25% and preferably is 25% of the full load as the engine load increases.

18. The method according to claim 14, in which the performance graph of the postinjection quantity and the injection instants for the postinjection, which are fixed by the closure of the injection valves at an end of the respective main injection, in the engine operating field is detected with the aid of sensors that detect the opening and closing signals of the injection valves, with regard to the soot emissions that then occur in the engine exhaust gas, and is defined in the performance graph in optimizing fashion for the particular engine at the various operating points and operating parameters.

19. The method according to claim 15, in which the performance graph of the postinjection quantity and the injection instants for the postinjection, which are fixed by the closure of the injection valves at an end of the respective main injection, in the engine operating field is detected with the aid of sensors that detect the opening and closing signals of the injection valves, with regard to the soot emissions that then occur in the engine exhaust gas, and is defined in the performance graph in optimizing fashion for the particular engine at the various operating points and operating parameters.

20. The method according to claim 2, in which in addition to the main injection and postinjection, the engine is operated with preinjection, and the optimized values of the injection pressure, injection onset of the main injection, postinjection quantity, injection onset of the preinjection, and the preinjection quantity are stored in a performance graph, which are processed by the electronic control unit to control the injection system and are converted into control signals for varying the aforementioned values during engine operation.

* * * * *